US010285000B2

(12) United States Patent
Schlaupitz et al.

(10) Patent No.: US 10,285,000 B2
(45) Date of Patent: *May 7, 2019

(54) APPARATUS AND METHOD FOR DETERMINING A WIRELESS DEVICE'S LOCATION AFTER SHUTDOWN

(71) Applicant: Apple Inc., Cupertino, CA (US)

(72) Inventors: Alexander D. Schlaupitz, San Jose, CA (US); Joshua G. Wurzel, Sunnyvale, CA (US); Ahmad Al-Dahle, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/821,009

(22) Filed: Nov. 22, 2017

(65) Prior Publication Data

US 2018/0206064 A1 Jul. 19, 2018

Related U.S. Application Data

(63) Continuation of application No. 15/148,995, filed on May 6, 2016, now Pat. No. 9,832,603, which is a
(Continued)

(51) Int. Cl.
*H04W 4/02* (2018.01)
*H04L 29/08* (2006.01)
(Continued)

(52) U.S. Cl.
CPC .............. *H04W 4/02* (2013.01); *H04L 67/26* (2013.01); *H04W 12/08* (2013.01);
(Continued)

(58) Field of Classification Search
CPC .............. H04W 4/02; H04W 52/0229; H04W 52/0254; H04W 12/08; H04L 67/26;
(Continued)

(56) References Cited

U.S. PATENT DOCUMENTS 6,298,229 B1 10/2001 Tomlinson et al.
6,614,393 B2 9/2003 Spratt
(Continued)

FOREIGN PATENT DOCUMENTS

EP 1170969 A 6/2001
EP 1170969 A1 1/2002
(Continued)

OTHER PUBLICATIONS

The English translation of the Office Action in related Japanese Patent Application No. 2016-9646, dated Feb. 20, 2017, 3 pages.
(Continued)

*Primary Examiner* — Brandon J Miller
(74) *Attorney, Agent, or Firm* — Womble Bond Dickinson (US) LLP

(57) ABSTRACT

A wireless data processing device is described which periodically exits an unpowered state and transmits location data. For example, one embodiment of a wireless data processing device comprises: power circuitry for maintaining the wireless data processing device in a powered or unpowered state, the power circuitry causing the wireless data processing device to enter into an unpowered state responsive to user input; a timer to periodically power up the wireless device or portion thereof in response to reaching a predetermined time; a location services module determining a current location of the wireless data processing device using one or more specified location determination techniques; a transmit thread transmitting the current location of the wireless device over one or more specified communication channels; and the power circuitry powering down the wireless data processing device a second time after the current location has been transmitted.

21 Claims, 7 Drawing Sheets

Related U.S. Application Data continuation of application No. 14/701,860, filed on May 1, 2015, now Pat. No. 9,338,596, which is a continuation of application No. 14/327,039, filed on Jul. 9, 2014, now Pat. No. 9,049,553, which is a continuation of application No. 13/454,014, filed on Apr. 23, 2012, now Pat. No. 8,849,303.

(51) Int. Cl.
*H04W 12/08* (2009.01)
*H04W 52/02* (2009.01)

(52) U.S. Cl.
CPC ... *H04W 52/0229* (2013.01); *H04W 52/0254* (2013.01); *Y02D 70/00* (2018.01); *Y02D 70/142* (2018.01); *Y02D 70/144* (2018.01); *Y02D 70/164* (2018.01); *Y02D 70/166* (2018.01); *Y02D 70/22* (2018.01)

(58) Field of Classification Search
CPC .. Y02D 70/166; Y02D 70/164; Y02D 70/142; Y02D 70/144; Y02D 70/22; Y02D 70/00
See application file for complete search history.

(56) References Cited

U.S. PATENT DOCUMENTS

| | | | |
|---|---|---|---|
| 7,359,713 | B1 | 4/2008 | Tiwari |
| 7,577,449 | B2 | 8/2009 | Simpson et al. |
| 7,590,837 | B2 | 9/2009 | Bhansali et al. |
| 8,013,734 | B2 | 9/2011 | Saigh et al. |
| 8,195,248 | B2 | 6/2012 | Ha et al. |
| 8,301,158 | B1 * | 10/2012 | Thomas .................. H04W 4/02 340/539.13 |
| 8,723,643 | B2 | 5/2014 | Wang et al. |
| 8,849,303 | B2 * | 9/2014 | Schlaupitz ........ H04W 52/0254 455/456.1 |
| 9,049,553 | B2 * | 6/2015 | Schlaupitz ........ H04W 52/0254 |
| 9,338,596 | B2 * | 5/2016 | Schlaupitz ........ H04W 52/0254 |
| 9,832,603 | B2 * | 11/2017 | Schlaupitz ........ H04W 52/0254 |
| 2003/0060212 | A1 | 3/2003 | Thomas |
| 2006/0089120 | A1 | 4/2006 | Luo et al. |
| 2006/0121951 | A1 | 6/2006 | Perdomo et al. |
| 2009/0119468 | A1 * | 5/2009 | Taylor ................ G06F 21/554 711/166 |
| 2009/0312055 | A1 * | 12/2009 | Liu ...................... H04B 1/3805 455/558 |
| 2010/0124896 | A1 | 5/2010 | Kumar |
| 2010/0173615 | A1 | 7/2010 | Harris |
| 2010/0248741 | A1 | 9/2010 | Setlur et al. |
| 2010/0273452 | A1 * | 10/2010 | Rajann .................... H04W 8/22 455/411 |
| 2010/0279676 | A1 | 11/2010 | Benn et al. |
| 2010/0332391 | A1 | 12/2010 | Khan |
| 2011/0055891 | A1 | 3/2011 | Rice |
| 2011/0076984 | A1 | 3/2011 | Flippo et al. |
| 2011/0143778 | A1 | 6/2011 | Hwang et al. |
| 2011/0183627 | A1 * | 7/2011 | Ueda .................. G01C 21/3438 455/67.11 |
| 2011/0217988 | A1 | 9/2011 | Heo et al. |
| 2013/0040657 | A1 | 2/2013 | Jackson |
| 2013/0332391 | A1 * | 12/2013 | Renshaw ............... G06Q 40/06 705/36 R |

FOREIGN PATENT DOCUMENTS

| | | |
|---|---|---|
| GB | 2412545 A | 9/2005 |
| JP | 2004356992 A | 12/2004 |
| JP | 2006-304175 A | 11/2006 |
| JP | 2006309532 A | 11/2006 |
| JP | 2007-036996 A | 2/2007 |
| JP | 2007-049356 A | 2/2007 |
| JP | 2007-074691 A | 3/2007 |
| JP | 2007324780 A | 12/2007 |
| JP | 2007325215 A | 12/2007 |
| JP | 2008121463 A | 5/2009 |
| JP | 4794361 B2 | 10/2011 |
| KR | 10-2004-0107661 A | 12/2004 |
| KR | 10-2007-0074361 A | 7/2007 |
| WO | 2005/108071 A1 | 11/2005 |
| WO | 2006/108071 A2 | 10/2006 |

OTHER PUBLICATIONS

Office Action received for European Application No. 13164613.5, dated Apr. 18, 2017, 5 pages.
Office Action received for European Application No. 13164613.5, dated Jul. 25, 2018, 5 pages.
Office Action received for European Application No. 13164613.5, dated Jan. 3, 2018, 4 pages.
International Search Report and Written Opinion received for PCT Patent Application No. PCT/US2013/037250, dated Jul. 2, 2013, 6 pages.
International Search Report & Written Opinion received for PCT Patent Application No. PCT/US2013/037260, dated Jul. 29, 2013, 10 pages.
International Preliminary Report on Patentability received for PCT Patent Application No. PCT/US2013/037260, dated Oct. 30, 2014, 7 pages.
International Preliminary Report on Patentability received for PCT Patent Application No. PCT/US2013/037250, dated Nov. 6, 2014, 6 pages.
European Search Report and Search Opinion Received for EP Application No. 13164613.5, dated Mar. 16, 2016, 11 pages.

* cited by examiner

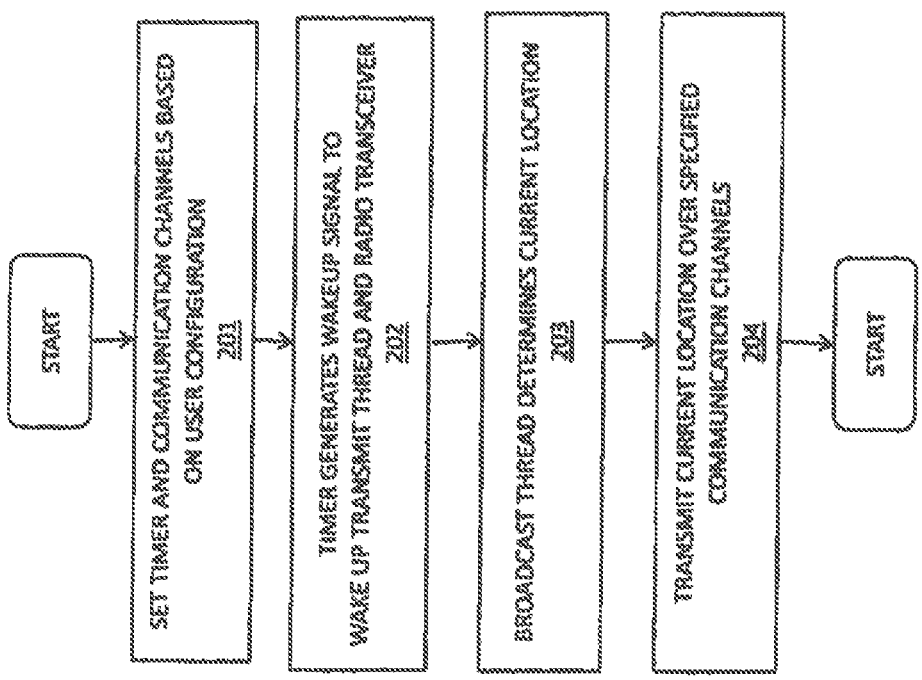

APPARATUS AND METHOD FOR DETERMINING A WIRELESS DEVICE'S LOCATION AFTER SHUTDOWN

This application is a continuation of co-pending U.S. application Ser. No. 15/148,995 filed May 6, 2016, which is a continuation of Ser. No. 14/701,860 filed May 1, 2015, now issued as U.S. Pat. No. 9,338,596, which is a continuation of U.S. application Ser. No. 14/327,039 filed on Jul. 9, 2014, now issued as U.S. Pat. No. 9,049,553, which is a continuation of U.S. application Ser. No. 13/454,014 filed on Apr. 23, 2012, now issued as U.S. Pat. No. 8,849,303.

BACKGROUND

Field of the Invention

This invention relates generally to the field of computer networking. More particularly, the invention relates to an improved apparatus and method for determining a wireless device's location after shutdown.

Description of Related Art

Current security features in handheld and portable products allow the location of the product to be identified when requested by the user, such as in instances where the product is lost or stolen. However, this technology is limited in cases where the product has been lost/stolen and subsequently switched off (i.e., to an unpowered state). The embodiments of the invention described below add an additional layer of security to locate devices in these situations.

BRIEF DESCRIPTION OF THE DRAWINGS

A better understanding of the present invention can be obtained from the following detailed description in conjunction with the following drawings, in which:

FIG. 2 illustrates one embodiment of a method for determining a wireless device's location after shut-down.

DETAILED DESCRIPTION OF PREFERRED EMBODIMENTS

Described below are embodiments of an apparatus, method, and machine-readable medium for establishing, maintaining and utilizing primary and/or backup peer-to-peer ("P2P") communication channels on a network. An invitation service and a matchmaker service are also described for inviting users and matching users, respectively, for P2P sessions. Additionally, a relay service is described to allow users to establish relay connections under certain specified conditions. Finally, an application framework and associated application programming interface (API) are described to allow application developers to design applications which take advantage of various collaborative online features described herein.

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

Apparatus and Method for Determining a Wireless Device's Location After Shutdown The embodiments of the invention described below allow wireless devices such as the iPad® or iPhone® (designed by the assignee of the present application) to automatically turn back on, send their location information, and turn off again after being initially shut down. In one embodiment of the invention, the software or hardware activates during the power-down sequence for the wireless device (such as after holding the Lock and Home buttons on an iPhone and entering the power-down screen) where an option appears to either enter a shutdown security code to disable the location security features before shutdown, or to bypass the code and activate the features during shutdown. In one embodiment, failing to enter the correct code after a specified number of attempts automatically activates the security features described herein and shuts down the wireless device.

In one embodiment, when activated, the device's current location is periodically transmitted over a designated set of communication channels (e.g., email, a designated network address, a text message, etc) and the device thereafter powers down until it is time for the next transmission. The frequency with which the device's current location is transmitted may be specified by the end user or may be set automatically in the software/firmware. The end user may also be provided with the option to disable the features described herein. In one embodiment, the location transmissions continue until the security code is properly entered when the unit is manually powered up by a user, and/or when the code is entered during one of the automatic power-ups.

Figure 1A:
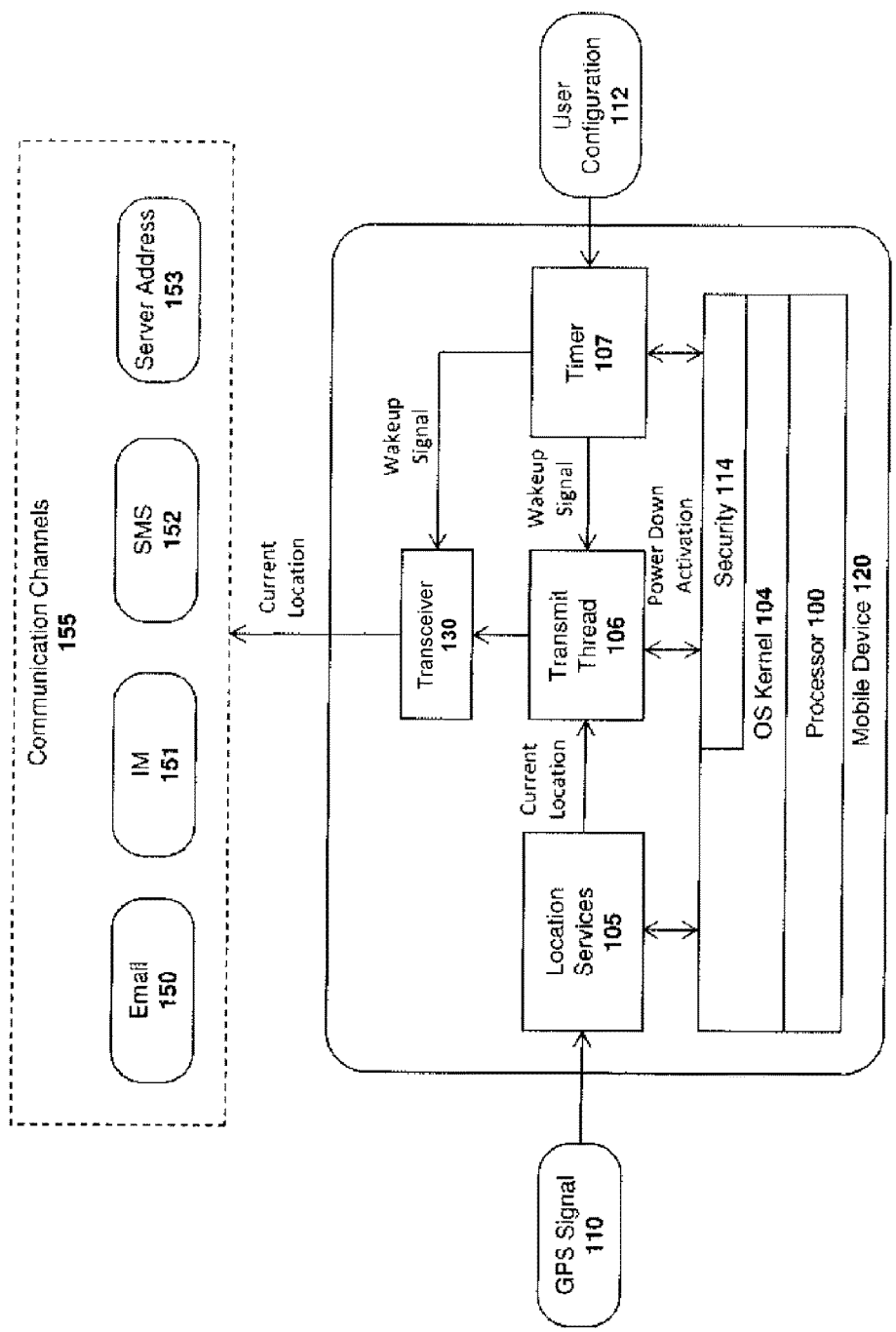
FIG. 1A illustrates one embodiment of the invention for determining a wireless device's location after power down.

FIG. 1A illustrates one embodiment of a mobile device 120 which includes a location services module 105 for determining a current location of the mobile device (e.g., using a global positioning system (GPS) signal 110); a transmit thread 106 for periodically transmitting the mobile device's location; and a timer module 107 for periodically waking the transmit thread 106. As indicated, the timer 107 may be programmed to wake the transmit thread 106 with a frequency configured by the end user 112. In one embodiment, a security component 114 of the device's operating system 104 manages the security code required to disable the periodic transmissions and activates the transmit thread 106 and timer 107 until the correct security code has been entered. In this embodiment, the OS 104 and all of the system components 105-107 are implemented as software executed by the mobile device's processor 100.

Once operational after a device power down, the timer 107 periodically wakes the transmit thread 106. The transmit thread 106 then retrieves the current location of the mobile device 120 from the location services module 105 and transmits the current location over one or more communication channels 155 via a wireless transceiver 130. In one embodiment, the communication channels (which may also be specified by the end user) include an email address 150, instant messaging address 151, short message service (SMS) message 152, and/or a server address 153.

For example, if email is used, the device's current location is stored within the subject line or body of an email and sent to a user-specified email address. If instant messaging is used, the device 120 may automatically log into an instant messaging service (specified by the user) and transmit an instant message to the user's IM account. If SMS is used, the transmit thread may invoke the SMS application on the mobile device 120 to transmit an SMS message to a designated phone number. If a server address is used, the transmit thread will send the device's current location to the server (e.g., to a specific uniform resource locator (URL)) using a pre-specified communication format (e.g., such as an XML document). The user may log in to the server using an alternate wireless device or computer to determine the mobile device's current location. Alternatively, the server may push the device's current location out to the user's alternate wireless device or computer.

Figure 1B:
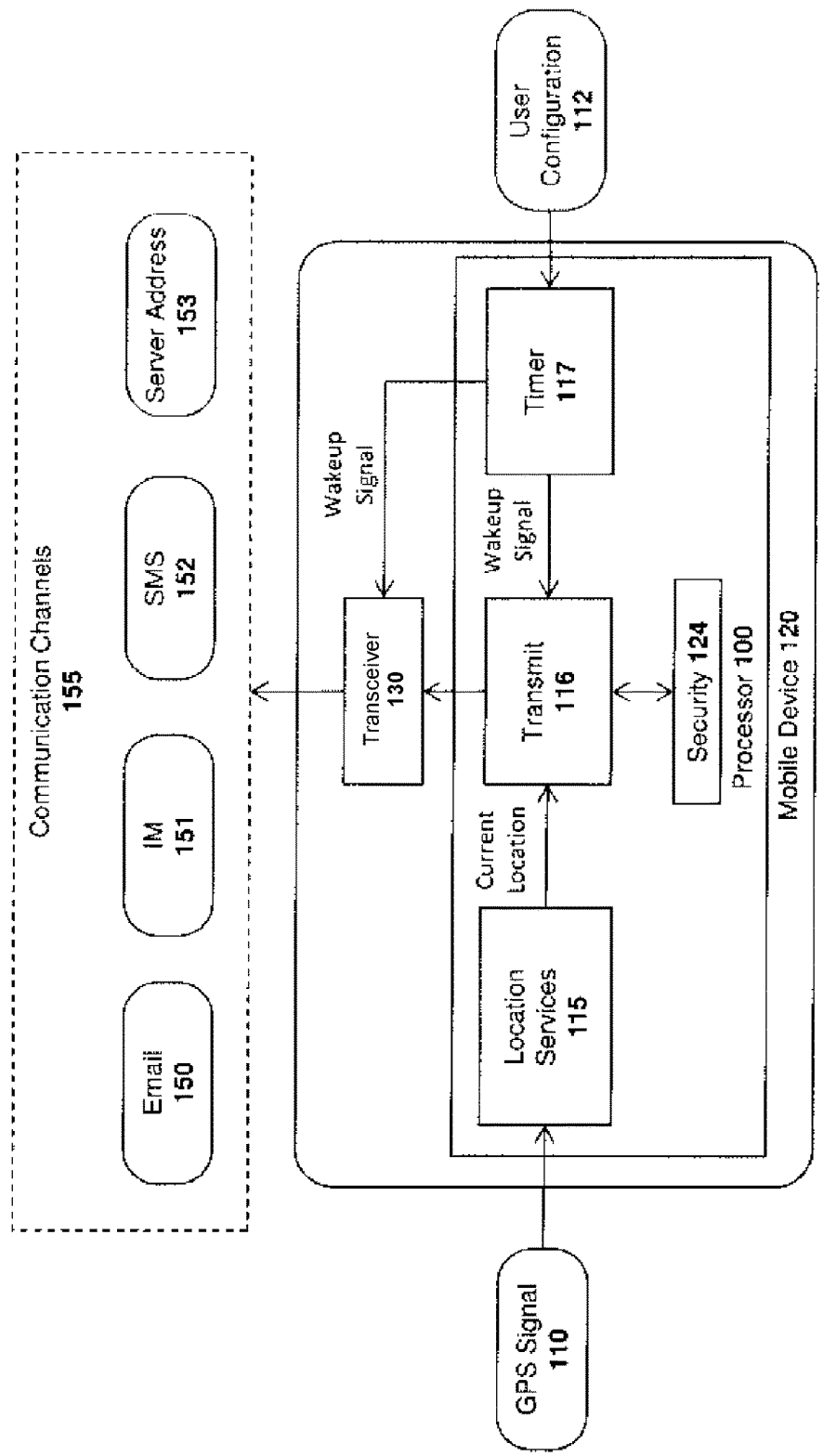
FIG. 1B illustrates another embodiment of the invention for determining a wireless device's location after shutdown.

In another embodiment of the invention, illustrated in FIG. 1B, the location services module 115, transmit module 116, timer module 117 and security module 124 are all implemented as hardware (e.g., as additional circuitry and/or firmware within the mobile device's processor 100, or using separate support circuitry). Aside from the fact that they are implemented in hardware, the functions performed by these modules 115-117, 124 is the same as described above with respect to FIG. 1A. Various additional or alternate implementations are contemplated.

In one embodiment, when the mobile device 120 turns on to send location information, the device will not revert to a fully powered state. For example, the display of the device may remain off. In addition, only those hardware and/or software components required to implement the features described herein may be activated (to save battery power). For example, in the software implementation shown in FIG. 1A, only those components of the operating system 104 required to execute the location services module 105, transmit thread 106 and timer 107 may be executed. In the hardware implementation shown in FIG. 1B, only the firmware and circuitry required to determine the device's current location and transmit that location information over a communication channel may be activated (e.g., such as the cellular or WiFi radio).

In one embodiment, a special graphic may be displayed on the mobile device's display to indicate that periodic location transmissions are occurring. Alternatively, the display may remain off while the device is transmitting its location. Additionally, an option may be provided allowing the user to enter the shutdown code and disable the security features. In one embodiment, when the code is entered the screen can turn on to show that the location security service has been properly disabled.

The shutdown code may be the same or different from the normal unlock code for the mobile device 120. The code may be numeric or alpha-numeric, a mechanical code (a specific sequence of button presses), a touchscreen code (draw a pattern on the touchscreen either with or without visual cues), a voice activated code, or a camera code that involves taking a picture of a QR code/2D barcode or 1D barcode. In one embodiment, the security features described above may be disabled by taking a picture of an object while the mobile device is in a particular orientation relative to the onboard compass.

Additionally, a two-part or multi-part authentication may be implemented. During the first authentication stage the screen may remain off, remain on but offer no cues, or a graphic may be displayed to enter the code. After the first authentication is complete the unit may request the second authentication (e.g., by turning on the display and displaying a graphic, vibrating, turning on the camera if a QR code is required, or having a voice prompt you over a speaker).

In one embodiment, the techniques described herein may be used in combination with hardware and/or software which performs 'remote wipes' on mobile devices. For example, in one embodiment, the mobile device 120 logs into an authorization server when it wakes up. The authorization server may then instruct the remote device to delete all user sensitive data (if previously instructed to do so by the end user) or to disable the security software described herein. The mobile device 120 may also check for authorization from the user when it automatically powers on and sends its location. The user may then remotely disable the security software or change the frequency the unit sends its location information.

While some embodiments described above provide a visual indication that a code is required, in one embodiment, no visual indication is provided to avoid alerting parties that the unit will be tracked after being shut down. When an incorrect code is entered the wireless device may remain in a sub-state with the display turned off (instead of shutting down completely) but with the wireless device still sending location information and the ability to enter the correct code. The wireless device may remain in this sub-state either continually or may be set to power on and enter this sub-state at specific time periods (such as the first 5-10 minutes of every hour). The software/hardware described herein may lock out the device for a specific amount of time after a specific number of failed unlock attempts, and may also be configured to wipe user-sensitive data (or all data) after a specific number of failed unlock attempts.

In one embodiment, information may be collected to supplement the location data. For example, the camera(s) of the device may be configured to automatically snap a picture and transmit the picture over one or more of the communication channels. In one embodiment, the mobile device is configured to send out its final location and IP address of the computer it is attached to just prior to a master reset (i.e., when the security software is still activated).

One embodiment of a method for transmitting a wireless device's location after power down is illustrated in FIG. 2. At 201, a timer and communication channels over which to transmit are programmed based on user input. For example, the user may specify that the device should wake up and transmit a location message over email and to a server every 15 minutes after being powered down. At 202, after the device is powered down, the timer generates a wakeup signal to wake up the transmit thread and radio transceiver. At 203, the transmit thread determines its current location (e.g., from the location services module 115) and, at 204, the transmit thread transmits its current location over the specified communication channels.

One embodiment of the invention utilizes radio frequency identification (RFID) and/or near field technology (NFC) as a "honing" to locate devices at higher resolutions. For example, in one embodiment, other devices (not shown) may use RFID and/or NFC to communicate with and identify the mobile device 120 and then transmit the identity of the mobile device 120 over one or more of the communication channels 155. The mobile device 120 of this embodiment does not need to fully power all of the components illustrated in FIG. 1B, thereby allowing the device to be located when its battery is drained.

In addition to location data, one embodiment of the invention transmits hardware-specific serial numbers encoded with user information (e.g., so the server can identify the user to communicate the location information with). Additionally, the above concepts may also be used to activate certain parts of the system to make it easier to locate the mobile device 120. For example, using RFID/NFC, a hardware signal can be activated to enable the audio portion of the system to help locate the device (e.g., by generating an audio signal from the mobile device 120 or the other devices communicating using RFID/NFC).

Different API Embodiments

Different embodiments described herein include an application programming interface (API) implemented by a software component (hereinafter "API implementing software component") that allows a different software component (hereinafter "API calling software component") to access and use one or more functions, methods, procedures, data structures, and/or other services provided by the API implementing software component. For example, an API allows a developer of an API calling software component (which may be a third party developer) to leverage specified features provided by an API implementing software component. There may be one API calling software component or there may be more than one such software component. An API can be a source code interface that a computer system or program library provides in order to support requests for services from a software application. An API can be specified in terms of a programming language that can be interpretative or compiled when an application is built, rather than an explicit low level description of how data is laid out in memory.

The API defines the language and parameters that API calling software components use when accessing and using specified features of the API implementing software component. For example, an API calling software component accesses the specified features of the API implementing software component through one or more API calls (sometimes referred to as function or method calls) exposed by the API. The API implementing software component may return a value through the API in response to an API call from an API calling software component. While the API defines the syntax and result of an API call (e.g., how to invoke the API call and what the API call does), the API typically does not reveal how the API call accomplishes the function specified by the API call. Various function calls or messages are transferred via the one or more application programming interfaces between the calling software (API calling software component) and an API implementing software component. Transferring the function calls or messages may include issuing, initiating, invoking, calling, receiving, returning, or responding to the function calls or messages. Hence, an API calling software component can transfer a call and an API implementing software component can transfer a call.

By way of example, the API implementing software component 310 and the API calling software component may be an operating system, a library, a device driver, an API, an application program, or other software module (it should be understood that the API implementing software component and the API calling software component may be the same or different type of software module from each other). The API calling software component may be a local software component (i.e., on the same data processing system as the API implementing software component) or a remote software component (i.e., on a different data processing system as the API implementing software component) that communicates with the API implementing software component through the API over a network. It should be understood that an API implementing software component may also act as an API calling software component (i.e., it may make API calls to an API exposed by a different API implementing software component) and an API calling software component may also act as an API implementing software component by implementing an API that is exposed to a different API calling software component.

The API may allow multiple API calling software components written in different programming languages to communicate with the API implementing software component (thus the API may include features for translating calls and returns between the API implementing software component and the API calling software component); however the API may be implemented in terms of a specific programming language.

Figure 3:
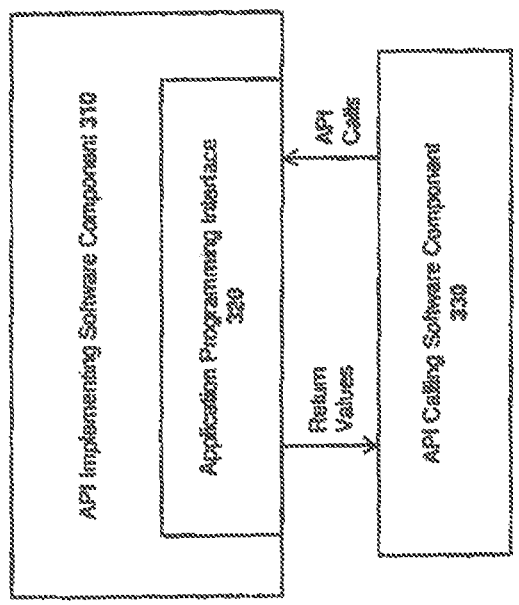
FIG. 3 illustrates an application programming interface employed in one embodiment of the invention.

FIG. 3 illustrates one embodiment of an API architecture which includes an API implementing software component 310 (e.g., an operating system, a library, a device driver, an API, an application program, or other software module) that implements the API 320. The API 320 specifies one or more functions, methods, classes, objects, protocols, data structures, formats and/or other features of the API implementing software component that may be used by the API calling software component 330. The API 320 can specify at least one calling convention that specifies how a function in the API implementing software component receives parameters from the API calling software component and how the function returns a result to the API calling software component. The API calling software component 330 (e.g., an operating system, a library, a device driver, an API, an application program, or other software module), makes API calls through the API 320 to access and use the features of the API implementing software component 310 that are specified by the API 320. The API implementing software component 310 may return a value through the API 320 to the API calling software component 330 in response to an API call.

It will be appreciated that the API implementing software component 310 may include additional functions, methods, classes, data structures, and/or other features that are not specified through the API 320 and are not available to the API calling software component 330. It should be understood that the API calling software component 330 may be on the same system as the API implementing software component 310 or may be located remotely and accesses the API implementing software component 310 using the API 320 over a network. While FIG. 3 illustrates a single API calling software component 330 interacting with the API 320, it should be understood that other API calling software components, which may be written in different languages (or the same language) than the API calling software component 330, may use the API 320.

The API implementing software component 310, the API 320, and the API calling software component 330 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 4:
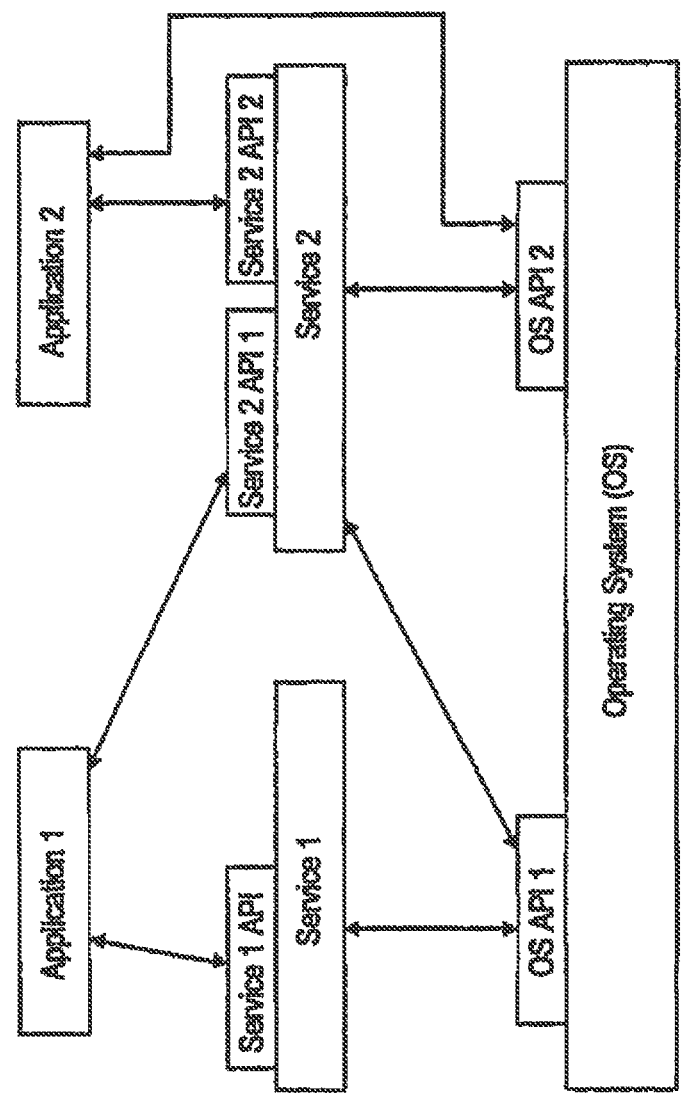
FIG. 4 illustrates exemplary applications interfacing to services and operating systems in accordance with one embodiment of the invention.

In FIG. 4 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Exemplary Data Processing Devices

Figure 5:
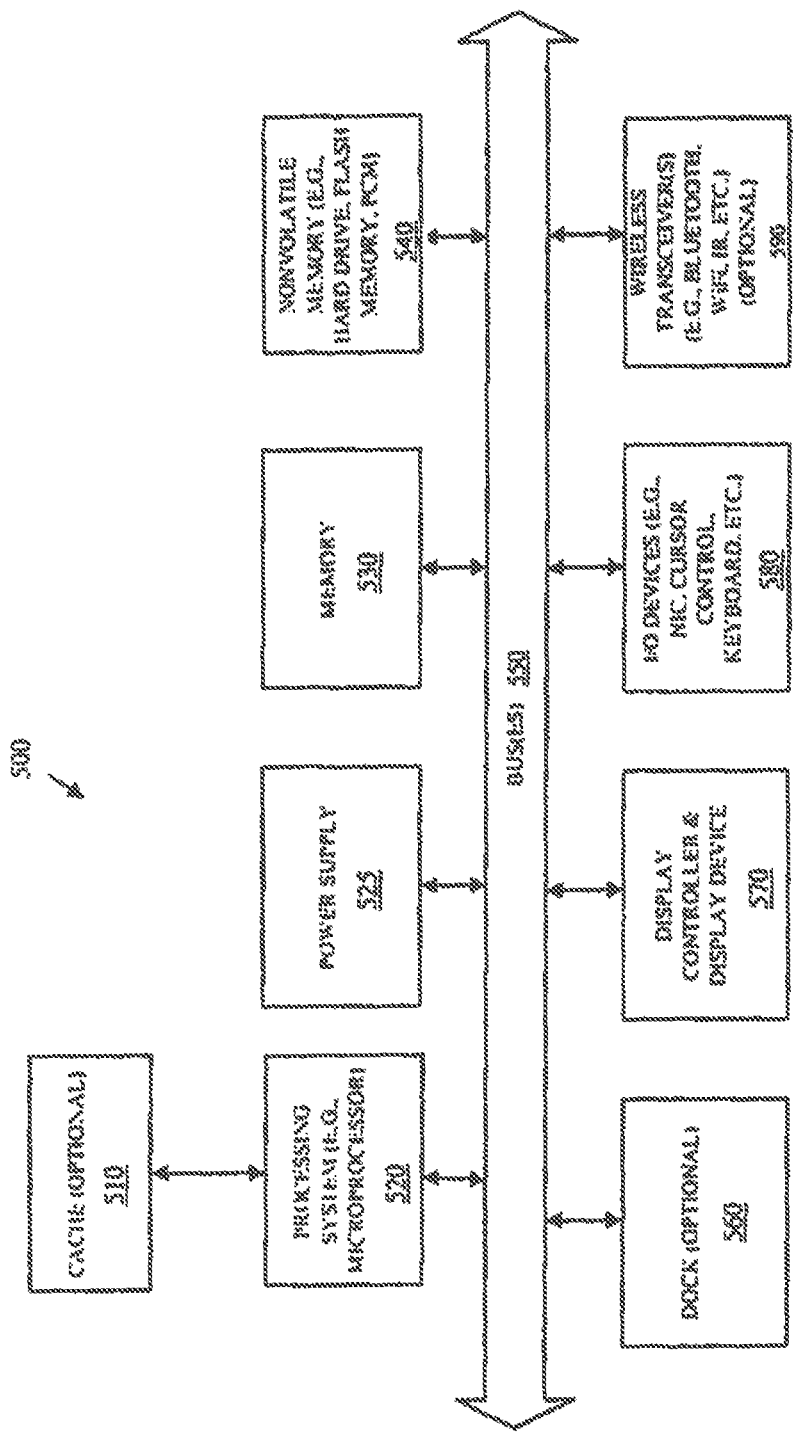
FIG. 5 illustrates an architecture of a data processing device on which embodiments of the invention may be implemented.

FIG. 5 is a block diagram illustrating an exemplary computer system which may be used in some embodiments of the invention. It should be understood that while FIG. 5 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 5, the computer system 500, which is a form of a data processing system, includes the bus(es) 550 which is coupled with the processing system 520, power supply 525, memory 530, and the nonvolatile memory 540 (e.g., a hard drive, flash memory, Phase-Change Memory (PCM), etc.). The bus(es) 550 may be connected to each other through various bridges, controllers, and/or adapters as is well known in the art. The processing system 520 may retrieve instruction(s) from the memory 530 and/or the nonvolatile memory 540, and execute the instructions to perform operations as described above. The bus 550 interconnects the above components together and also interconnects those components to the optional dock 560, the display controller & display device 570, Input/Output devices 580 (e.g., NIC (Network Interface Card), a cursor control (e.g., mouse, touchscreen, touchpad, etc.), a keyboard, etc.), and the optional wireless transceiver(s) 590 (e.g., Bluetooth, WiFi, Infrared, etc.).

Figure 6:
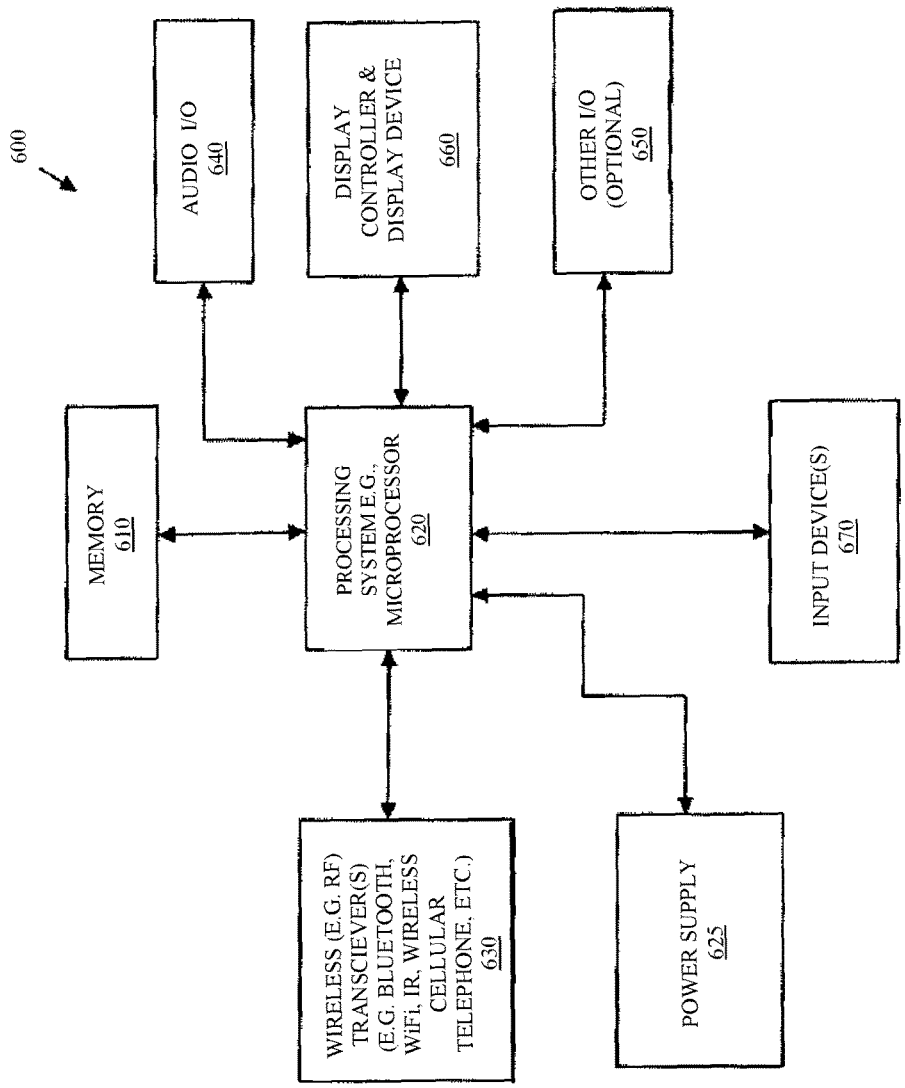
FIG. 6 illustrates another architecture of a data processing device on which embodiments of the invention may be implemented.

FIG. 6 is a block diagram illustrating an exemplary data processing system which may be used in some embodiments of the invention. For example, the data processing system 600 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 600 may be a network computer or an embedded processing device within another device.

According to one embodiment of the invention, the exemplary architecture of the data processing system 600 may used for the mobile devices described above. The data processing system 600 includes the processing system 620, which may include one or more microprocessors and/or a system on an integrated circuit. The processing system 620 is coupled with a memory 610, a power supply 625 (which includes one or more batteries) an audio input/output 640, a display controller and display device 660, optional input/output 650, input device(s) 670, and wireless transceiver(s) 630. It will be appreciated that additional components, not shown in FIG. 6, may also be a part of the data processing system 600 in certain embodiments of the invention, and in certain embodiments of the invention fewer components than shown in FIG. 6 may be used. In addition, it will be appreciated that one or more buses, not shown in FIG. 6, may be used to interconnect the various components as is well known in the art.

The memory 610 may store data and/or programs for execution by the data processing system 600. The audio input/output 640 may include a microphone and/or a speaker to, for example, play music and/or provide telephony functionality through the speaker and microphone. The display controller and display device 660 may include a graphical user interface (GUI). The wireless (e.g., RF) transceivers 630 (e.g., a WiFi transceiver, an infrared transceiver, a Bluetooth transceiver, a wireless cellular telephony transceiver, etc.) may be used to communicate with other data processing systems. The one or more input devices 670 allow a user to provide input to the system. These input devices may be a keypad, keyboard, touch panel, multi touch panel, etc. The optional other input/output 650 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although embodiments of the invention are described herein within the context of a mobile computing environment (i.e., using mobile devices 120-123; 601-603), the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

We claim:

1. A computer implemented method for automatically transmitting a location of a wireless data processing device of a user, comprising:
receiving an input that provides a security code to the wireless data processing device;
in response to the security code having been entered incorrectly a predetermined number of times:
keeping the wireless data processing device in a lock mode;
temporarily powering up the wireless data processing device or portion thereof in response to reaching a predetermined time while in the lock mode;

determining a current location of the wireless data processing device using one or more specified location determination techniques;

transmitting the current location of the wireless data processing device to one or more servers over one or more specified communication channels, and causing at least one of the one or more servers to transmit the current location of the wireless data processing device to one or more alternate devices of the user; and keeping the wireless data processing device in the lock mode after the current location has been transmitted.

2. The method of claim 1, wherein:
a server of the one or more servers comprises one or more email servers,
a specified communication channel of the one or more specified communication channels comprises email,
the current location of the wireless data processing device is stored within a subject line or body of an email sent to an email address of the user, and
the one or more email servers forward the email to one or more alternate devices of the user.

3. The method of claim 1, wherein:
a server of the one or more servers comprises one or more instant message (IM) servers,
a specified communication channel of the one or more specified communication channels comprises instant messaging,
the wireless data processing device automatically logs into an IM account of the user,
the wireless data processing device transmits an IM having the current location of the wireless data processing device to the user's IM account, and
the one or more IM servers forward the IM to one or more alternate devices of the user.

4. The method of claim 1, wherein:
a server of the one or more servers comprises one or more short message service (SMS) servers,
a specified communication channel of the one or more specified communications channels comprises SMS messaging,
the wireless data processing device transmits an SMS message having the current location of the wireless data processing device to the user's SMS message account, and
the one or more SMS servers forward the SMS message to one or more alternate devices of the user.

5. The method of claim 1, wherein:
wherein a transmit thread sends the current location of the wireless data processing device to a server of the one or more servers to a specific uniform resource locator (URL) using a pre-specified communication format.

6. The method of claim 5, wherein the pre-specified communication format comprises an XML document.

7. The method of claim 1, wherein the security code comprises an image.

8. A non-transitory computer readable medium storing instructions that when executed by a processing system having at least one hardware processor, perform operations for securing a wireless data processing device, the operations comprising:

receiving an input that provides a security code to the wireless data processing device;

in response to the security code having been entered incorrectly a predetermined number of times:
keeping the wireless data processing device in a lock mode;

temporarily powering up the wireless data processing device or portion thereof in response to reaching a predetermined time while in the lock mode;

determining a current location of the wireless data processing device using one or more specified location determination techniques;

transmitting the current location of the wireless data processing device to one or more servers over one or more specified communication channels, and causing at least one of the one or more servers to transmit the current location of the wireless data processing device to one or more alternate devices of the user; and keeping the wireless data processing device in the lock mode after the current location has been transmitted.

9. The medium of claim 8, wherein:
a server of the one or more servers comprises one or more email servers,
a specified communication channel of the one or more specified communications channels comprises email,
the current location of the wireless data processing device is stored within a subject line or body of an email sent to an email address of the user, and
the one or more email servers forward the email to one or more alternate devices of the user.

10. The medium of claim 8, wherein:
a server of the one or more servers comprises one or more instant message (IM) servers,
a specified communication channel of the one or more specified communications channels comprises instant messaging,
the wireless data processing device automatically logs into an IM account of the user,
the wireless data processing device transmits an IM having the current location of the wireless data processing device to the user's IM account, and
the one or more IM servers forward the IM to one or more alternate devices of the user.

11. The medium of claim 8, wherein:
a server of the one or more servers comprises one or more short message service (SMS) servers,
a specified communication channel of the one or more specified communications channels comprises SMS messaging,
the wireless data processing device transmits an SMS message having the current location of the wireless data processing device to the user's SMS message account, and
the one or more SMS servers forward the SMS message to one or more alternate devices of the user.

12. The medium of claim 8, wherein:
wherein a transmit thread sends the current location of the wireless data processing device to a server of the one or more servers to a specific uniform resource locator (URL) using a pre-specified communication format.

13. The medium of claim 12, wherein the pre-specified communication format comprises an XML document.

14. The medium of claim 8, wherein the security code comprises an image.

15. A system comprising:
a processing system comprising at least one hardware processor, programmed with executable instructions that, when executed, perform operations for securing a wireless data processing device comprising:

receiving an input that provides a security code to the wireless data processing device;

in response to the security code having been entered incorrectly a predetermined number of times:

keeping the wireless data processing device in a lock mode;

temporarily powering up the wireless data processing device or portion thereof in response to reaching a predetermined time while in the lock mode;

determining a current location of the wireless data processing device using one or more specified location determination techniques;

transmitting the current location of the wireless data processing device to one or more servers over one or more specified communication channels, and causing at least one of the one or more servers to transmit the current location of the wireless data processing device to one or more alternate devices of the user; and keeping the wireless data processing device in the lock mode after the current location has been transmitted.

16. The system of claim 15, wherein:

a server of the one or more servers comprises one or more email servers, a specified communication channel of the one or more specified communications channels comprises email, the current location of the wireless data processing device is stored within a subject line or body of an email sent to an email address of the user, and the one or more email servers forward the email to one or more alternate devices of the user.

17. The system of claim 15, wherein:

a server of the one or more servers comprises one or more instant message (IM) servers, a specified communication channel of the one or more specified communications channels comprises instant messaging, the wireless data processing device automatically logs into an IM account of the user, the wireless data processing device transmits an IM having the current location of the wireless data processing device to the user's IM account, and the one or more IM servers forward the IM to one or more alternate devices of the user.

18. The system of claim 15, wherein:

a server of the one or more servers comprises one or more short message service (SMS) servers, a specified communication channel of the one or more specified communications channels comprises SMS messaging, the wireless data processing device transmits an SMS message having the current location of the wireless data processing device to the user's SMS message account, and the one or more SMS servers forward the SMS message to one or more alternate devices of the user.

19. The system of claim 15, wherein:

wherein a transmit thread sends the current location of the wireless data processing device to a server of the one or more servers to a specific uniform resource locator (URL) using a pre-specified communication format.

20. The system of claim 19, wherein the pre-specified communication format comprises an XML document.

21. The system of claim 15, wherein the security code comprises an image.

* * * * *